(12) United States Patent
Collins et al.

(10) Patent No.: US 8,947,830 B1
(45) Date of Patent: Feb. 3, 2015

(54) METHOD OF FORMING ELECTRICAL CONNECTIONS FROM SOLDER POSTS

(71) Applicant: Seagate Technology LLC, Cupertino, CA (US)

(72) Inventors: Aaron Michael Collins, Minneapolis, MN (US); Scott Matzke, Shakopee, MN (US); Christopher Unger, Chanhassen, MN (US); Paul Davidson, Eden Prairie, MN (US); Daniel Richard Buettner, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/300,442

(22) Filed: Jun. 10, 2014

(51) Int. Cl.
*G11B 5/48* (2006.01)

(52) U.S. Cl.
USPC ........................................... 360/234.5

(58) Field of Classification Search
USPC ................................................. 360/234.5
See application file for complete search history.

(56) References Cited

U.S. PATENT DOCUMENTS

| | | | |
|---|---|---|---|
| 5,327,013 A | 7/1994 | Moore et al. | |
| 5,530,604 A | 6/1996 | Pattanaik | |
| 5,821,494 A | 10/1998 | Albrecht et al. | |
| 6,518,096 B2 | 2/2003 | Chan et al. | |
| 7,239,484 B2 * | 7/2007 | Yamaguchi ................ | 360/234.5 |
| 7,619,856 B2 * | 11/2009 | Matsumoto et al. ........ | 360/234.5 |
| 7,640,649 B2 * | 1/2010 | Fukaya et al. ............. | 29/603.02 |
| 7,765,678 B2 * | 8/2010 | Yamaguchi et al. ....... | 29/603.16 |
| 8,213,121 B2 * | 7/2012 | Dela Pena et al. ......... | 360/234.5 |
| 8,259,415 B2 * | 9/2012 | Hutchinson et al. ....... | 360/234.5 |
| 8,422,170 B2 * | 4/2013 | Chou et al. ................. | 360/234.5 |

* cited by examiner

*Primary Examiner* — Mark Blouin
(74) *Attorney, Agent, or Firm* — Kagan Binder, PLLC (57) ABSTRACT

A method for forming an electrical interconnection between a slider pad and a suspension pad that is adjacent to and positioned at an angle relative to the slider pad, which includes the steps of forming a solder bump on a first surface of the slider pad, reshaping the solder bump into a protrusion having an ellipsoidal shape that extends from the slider pad and contacts the suspension pad, and applying a laser to the ellipsoidal protrusion to reflow the solder bump while simultaneously applying a downward pressure to the solder bump in order to form a solder fillet between the slider pad and the suspension pad.

15 Claims, 6 Drawing Sheets

METHOD OF FORMING ELECTRICAL CONNECTIONS FROM SOLDER POSTS

BACKGROUND

Hard disc drive (HDD) systems typically include one or more data storage discs with concentric tracks containing information. A transducing head carried by a slider is used to read from and write to a data track on a disc, wherein each slider has an air bearing surface that is supportable by a cushion of air generated by one of the rotating discs. The slider is carried by an arm assembly that includes an actuator arm and a suspension assembly, which can include a separate gimbal structure or can integrally form a gimbal.

As the density of data desired to be stored on discs continues to increase, more precise positioning of the transducing head and other components is becoming increasingly important. In many conventional systems, head positioning is accomplished by operating the actuator arm with a large scale actuation motor, such as a voice coil motor, to position a head on a flexure at the end of the actuator arm. A high resolution head positioning mechanism, or microactuator, is advantageous to accommodate the high data density.

The manufacturing of components of HDD systems often includes providing an electrical connection via solder material between sliders and suspension assemblies, either of which may include bonding pads. This solder material is often supplied to a component via solder jetting, which can have at least some inherent trajectory error and possible solder ball expansion upon impact with a surface to which it is applied that can lead to inadequate separation between pads and traces. This can then lead to bridging or open connections, particularly in high-density applications. Thus, there is a desire to provide additional solder placement techniques that allow for accurate solder connections in high density applications.

SUMMARY

Aspects of the invention described herein are directed to the processing of solder materials to provide for accurate attachment of sliders to their associated head gimbal assemblies in hard disc drives. Such methods and configurations are particularly beneficial with the continuing desire to decrease the size of electronic components in the data storage industry. In particular, aspects of the invention are directed to plating solder on back pads at the wafer level for precision solder positioning in head gimbal assembly thermal interconnects, along with providing a removable casing to protect the posts through slider processing. After the solder posts are positioned in this manner on the back pads, these posts provide the feed material for a surface tension driven interconnect.

In order to minimize potential issues created by excessive heat that can occur if using a reflow oven, for example, the present invention utilizes a laser to provide the heat for reflow of solder posts to create desired connections between components. The use of solder posts on the slider pads can be provided at an aspect ratio of the solder volume to pad area so that application of a laser will form the molten solder material into an ellipsoid on the solder pad with dimensions that provide for contact with the corresponding suspension pad. The process can optionally include application of pressurized nitrogen, such as can be provided by a nozzle that is directed at a predetermined angle to controllably shape the molten solder during reflow.

In one aspect of the present invention, a method is provided for forming an electrical interconnection between a slider pad and a suspension pad that is adjacent to and positioned at an angle relative to the slider pad. The method includes the steps of forming a solder bump on a first surface of the slider pad, reshaping the solder bump into a protrusion having an ellipsoidal shape that extends from the slider pad and contacts the suspension pad, and applying a laser to the ellipsoidal protrusion to reflow the solder bump while simultaneously applying a downward pressure to the solder bump in order to form a solder fillet between the slider pad and the suspension pad. With this method, the step of applying downward pressure to the solder bump can include ejecting material in a downward direction from a pressurized source toward the solder bump, wherein the ejected material may be pressurized nitrogen being applied by a nozzle. The downward pressure of the ejected material can be applied in a direction that is generally parallel to the first surface of the slider pad, and the step of reshaping the solder bump can include applying a laser to the solder bump.

In another aspect of the invention, a method is provided for making a solder bump on each of a plurality of slider pads for use in forming a plurality of electrical interconnections, each of which is between one slider pad and one suspension pad. The method includes the steps of forming a solder post on each of a plurality of slider pads, wherein the slider pads are positioned adjacent to each other relative to a plurality of sliders of a wafer, encasing the solder posts in a protective material, separating the plurality of slider pads from each other, and removing the protective material to expose the solder post of each of the slider pads. The slider pads can be positioned in multiple rows on the wafer. The step of separating slider pads from each other can include slicing the wafer into multiple rows, each of which corresponds to one of the rows of slider pads, and dicing each of the multiple rows into a plurality of sliders, each of which comprises one of the slider pads. The step of removing the protective material can include etching the protective material away from each of the solder posts. After the protective material removal step, the method can include forming each of the solder posts into a solder bump on a first surface of each slider pad, reshaping each solder bump into a protrusion having an ellipsoidal shape that extends from one of the slider pads and contacts one of a plurality of suspension pads, and applying a laser to each reshaped protrusion to reflow each solder bump while simultaneously applying a downward pressure to the solder bump in order to form a solder fillet between each slider pad and its corresponding suspension pad.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
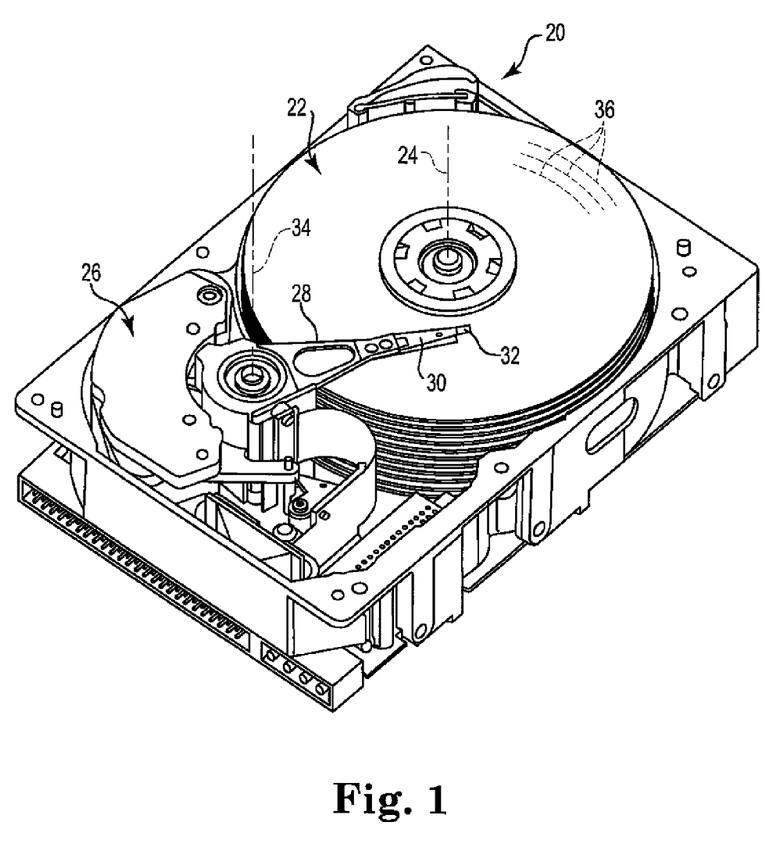
FIG. 1 is a perspective view of an exemplary hard disk drive (HDD) system.

Referring now to the Figures, wherein the components are labeled with like numerals throughout the several Figures, and initially to FIG. 1, an exemplary configuration of a typical hard disk drive (HDD) system 20 is illustrated. The HDD system generally includes at least one magnetic storage disk 22 configured to rotate about an axis 24, an actuation motor 26 (e.g., a voice coil motor), an actuator arm 28, a suspension assembly 30 that includes a load beam, and a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (USA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. A stack of co-rotating disks 22 can be provided with additional actuator arms 28, suspension assemblies 30, and sliders 32 that carry read/write heads for reading and writing at top and bottom surfaces of each disk 22 in the stack.

Figure 2:
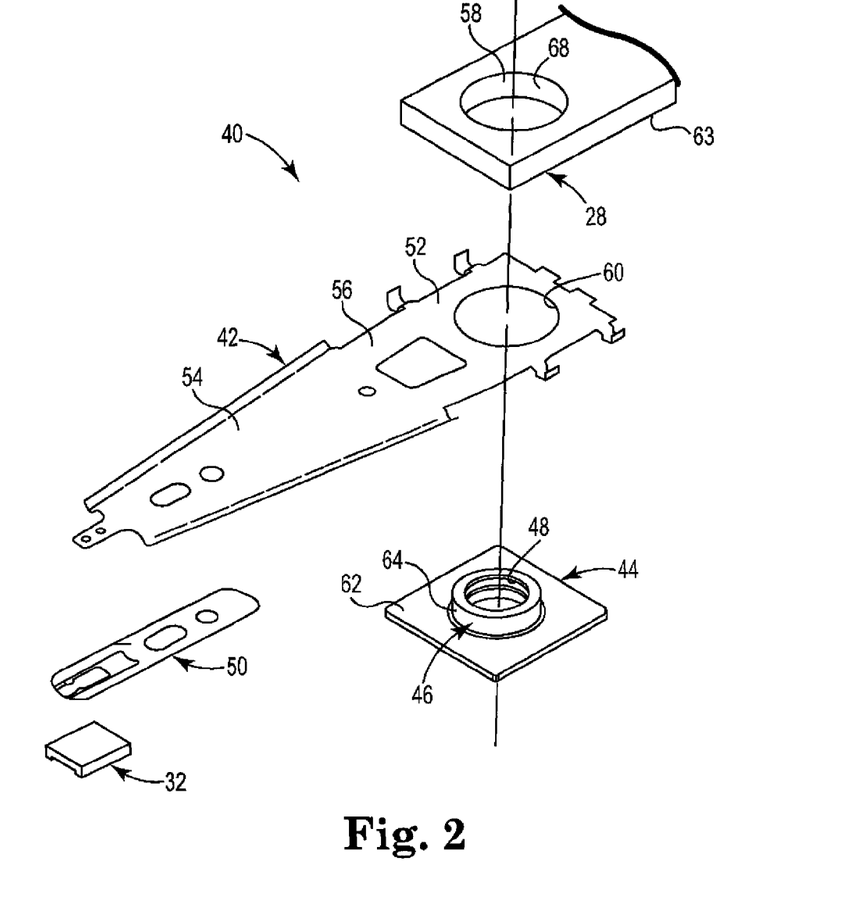
FIG. 2 is a perspective view of an exploded head stack assembly of the type that can be used in an HDD system, such as the system illustrated in FIG. 1.

In order to better illustrate sliders and associated components of the type discussed herein relative to the invention, FIG. 2 provides an exploded, perspective view of a typical head stack assembly (HSA) 40 of FIG. 1, which includes a load beam 42, actuator arm 28, and a base plate 44 with an upwardly projecting boss tower 46. In the illustrated embodiment, HSA 40 includes a flexure piece 50 to which slider 32 (which includes a transducing or read/write head) is mountable. Flexure 50 may be attached to load beam 42 by any conventional mechanism or may be integral with load beam 42. In some embodiments, load beam 42, flexure 50 and slider 32 can be referred to as a head suspension assembly. Load beam 42 includes a mounting region 52 at a proximal end, a rigid region 54 adjacent to the distal end of the load beam 42, and a spring region 56 between the mounting region 52 and rigid region 54. An aperture 60 is extends through the mounting region 52. Spring region 56 is relatively resilient and provides a downward bias force at the distal tip of load beam 42 for holding the slider 32 with read/write head near a spinning disk in opposition to an upward force created by the air bearing over the disc. HSA 40 is typically coupled to actuation motor 26 of the type illustrated in FIG. 1, for example, via actuator arm 28 that is attached to mounting region 52 of load beam 42.

The read/write heads described above are carried by a slider that is used to read from and write to a data track on a disc. The slider is carried by an arm assembly that includes an actuator arm and a suspension assembly, which can include a separate gimbal structure or can integrally form a gimbal. In a typical process, an array of sliders are formed on a common substrate or an AlTiC wafer which is then sliced to produce bars, with a row of sliders in a side-by-side pattern on each bar. The bars (which can be referred to as row bars) are then subjected to a series of processes to form individual sliders, including lapping, cleaning, formation of air-bearing surfaces (ABS), and dicing.

Figure 3:
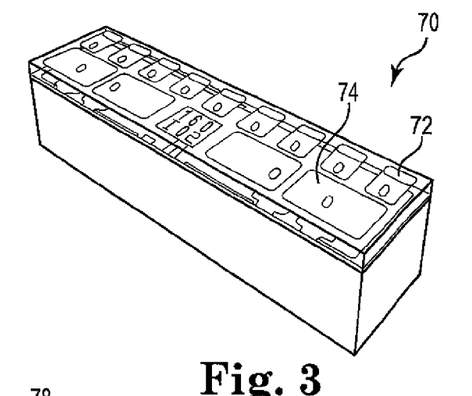
FIG. 3 is a perspective view of an embodiment of a slider of the invention, prior to the addition of solder posts.

Referring now to FIGS. 3-6, perspective views of an exemplary embodiment of a slider 70 are illustrated relative to several steps in the formation of protected solder posts. With this process, the introduction of electroplated solder posts can be performed at the wafer level and protected from contamination by oxidation and/or material deposition, for example. FIG. 3 illustrates the slider 70, which includes multiple slider bond pads 72 and multiple test pads 74 and can be coated with a layer of protective material, such as TaO, for example. This protective material is provided to protect an underlying layer from the additional processing steps described herein. In particular, the protective material acts as an etch stop between the encasement material and the film stack of the read write head, which can be primarily made of AlO, for example, and for which protection is desired during the removal process. The etch stop or protective layer can also cover a portion of the gold pads that are beneath it, wherein the area that is left open or uncoated can be plated with material.

Figure 4:
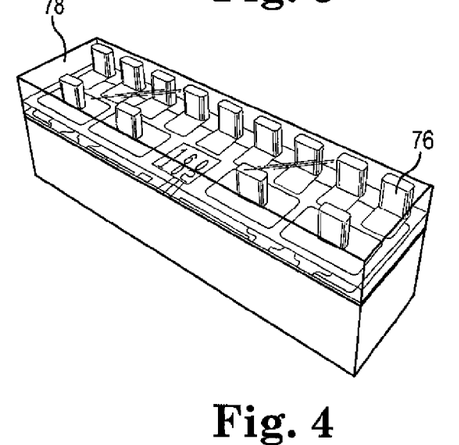
FIG. 4 is a perspective view of the slider of FIG. 3, with the addition of solder posts and a layer of protective material.
Figure 5:
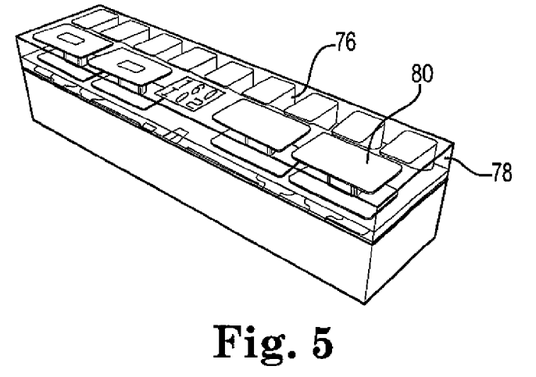
FIG. 5 is a perspective view of the slider of FIG. 4, with the addition of test pads on the protective material layer.
Figure 6:
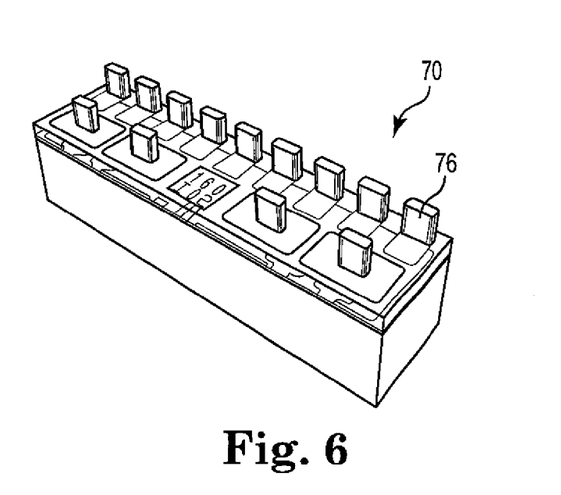
FIG. 6 is a perspective view of the slider of FIG. 5, with the protective material layer removed to expose the solder posts.

Solder posts 76 are then deposited onto the slider bond pads 72, as is illustrated in FIG. 4. These posts 76 are configured to have a height, width, and depth that will provide for a sufficient bond in further processing of the slider. Next, a protective encasement material layer 78 is back-filled or otherwise added to the top of the slider 70 to encase the solder posts 76. Encasement material layer 78 may be made of a material such as SiO, for example. Alternatively, the encasement material layer 78 may be made of a different material such as AlO, particularly in applications in which the slider stack is made As shown in FIG. 5, bond pads 80 (e.g., gold bond pads) are placed on top of the encasement material layer 78 in a pattern that matches or generally matches the pad configuration of the underlying slider 70. After the slicing and dicing process is completed, the encasement material layer 78 is etched away from the solder posts 76, thereby leaving uncoated solder posts 76 extending from the slider 70, as is illustrated in FIG. 6, for example.

The use of the encasement material in the above-described methods of producing sliders with solder posts (which can also be referred to as "pre-bumped sliders") can be used in the above-described processes, along with other existing processes, wherein this encasement material can help to prevent debris from being captured between solder posts during the slicing and/or dicing processes. In addition, the above-described methods advantageously allow for the formation of solder interconnects at sizes that are considerably smaller than can typically be achieved using solder jetting methods, for example. In this way, the interconnect density can be substantially increased. In addition to control of the solder post sizes, the above-described methods provide for better control of the volume, positioning, and dimensions of the solder posts. In accordance with the invention, the solder post production methods described herein can be used in a number of different processes, wherein one example is using these methods in combination with a laser reflow thermal interconnect process of the type that is described below.

Figure 7:
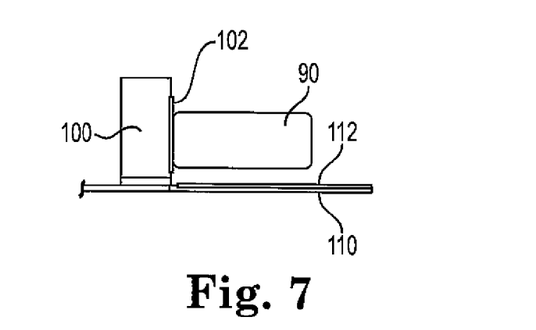
FIG. 7 is a schematic side view of a solder post extending from a slider and positioned relative to a portion of a suspension arm.
Figure 8:
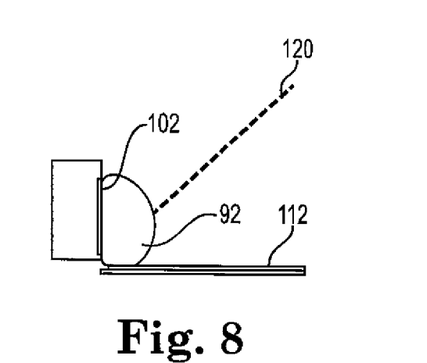
FIG. 8 is a schematic side view of the solder post of FIG. 7 being reformed with an applied laser to form an ellipsoid protrusion.
Figure 9:
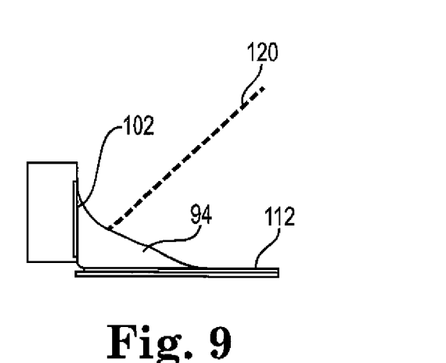
FIG. 9 is a schematic side view of the ellipsoid protrusion of FIG. 8 reformed into a fillet with an applied laser.

Referring now to FIGS. 7-15, a method is illustrated that allows for increased interconnect density for end bond interconnects. The use of the pre-bumped sliders on end bond pads, which can be formed using the process described above and/or another process, provides sufficient feed material for an interconnect that does not use a reflow oven, but instead uses a laser. In particular, FIGS. 7-9 illustrate an embodiment of invention in which a solder post or pre-bump 90 is used to electrically connect two orthogonal elements, which include a slider 100 and a suspension arm 110 supporting the slider 100. Slider 100 is attached to suspension arm 110, such as with an adhesive, for example. The slider 100 includes a slider bonding pad 102 attached to an outer surface, and solder post 90 is attached to and extends from slider bonding pad 102. Suspension arm 110 includes a suspension bonding pad 112, which is attached to an outer surface so that the suspension bonding pad 112 is generally perpendicular to slider bonding pad 102. As shown, the solder post 90 extends at least partially over the suspension bonding pad 112. In order to electrically connect the slider 100 to the suspension arm 110, the solder post 90 is reformed to provide a physical connection between the slider bonding pad 102 and the suspension bonding pad 112.

FIG. 7 provides a representation of solder post 90 prior to initiation of a reforming or reflowing process. FIG. 8 illustrates the same components shown in FIG. 7, with a representative laser 120 being applied at an angle to the solder post 90. In this step, the solder is driven to reform the solder post 90 into an ellipsoidal protrusion 92. The protrusion 92 is forced into contact with the bonding pad 112 of the suspension arm 110, wherein the solder post 90 includes a sufficient amount of solder material to provide such contact after deformation, but not so much material that it can expand beyond the desired expansion limits (e.g., onto adjoining components).

As shown in FIG. 9, continued application of the same laser 120 or a different laser at either the same or a different strength will cause the elliptical protrusion 92 to further deform to form a right angled solder fillet 94. This solder fillet provides an electrical connection between the bonding pad 102 of slider 100 and the bonding pad 112 of the suspension arm 110.

Figure 10:
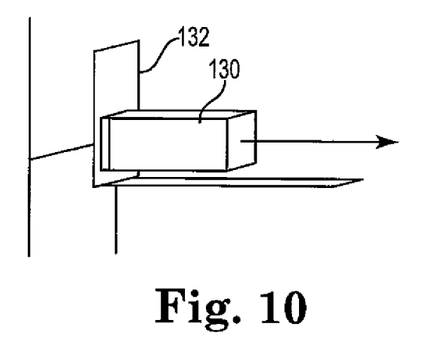
FIG. 10 is a perspective view of a model of a solder post extending from a flat surface, such as a slider pad.
Figure 11:
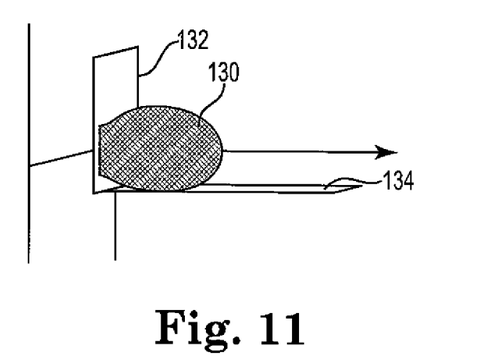
FIG. 11 is a perspective view of a model of the solder post of FIG. 10 in a partially deformed state.
Figure 12:
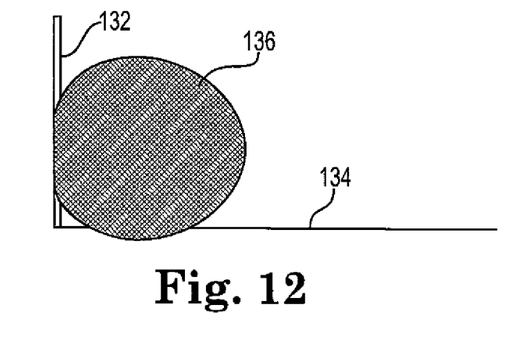
FIG. 12 is a side view of a model of the solder post of FIG. 11, which has been even further deformed to contact a perpendicular surface, such as a bonding pad of a suspension.

Referring additionally to FIGS. 10-12, a surface tension driven model of a solder post 130 is illustrated as it is reformed into an ellipsoid protrusion. In this embodiment, a solder post 130 extends from a first surface 132, which is modeled as a slider pad that is approximately 42 μm wide by 35 μm high, for example. The solder post 130 is approximately 100 μm long, which extends from the first surface or slider pad 132, as shown in FIG. 10. Application of a laser to the solder post 130 causes its deformation, wherein FIG. 11 is a model of the solder post 130 in an intermediate state in which its lower surface is nearly in contact with a second surface 134 that is positioned at an angle (e.g., 90 degrees) to the first surface 132. FIG. 12 is a model of the solder post 130 after it has been farther deformed, producing an ellipsoid 136 with a major axis diameter of 69 μm that contacts the second surface 134, which is positioned 13 μm below the edge of the slider pad 132, for example.

Figure 13:
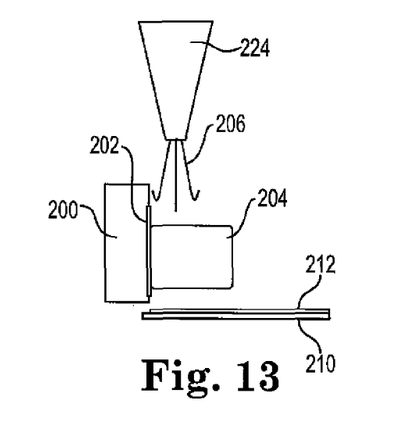
FIG. 13 is a schematic side view of a solder post extending from a slider and positioned relative to a portion of a suspension arm and a nozzle from which pressurized material is exiting.
Figure 14:
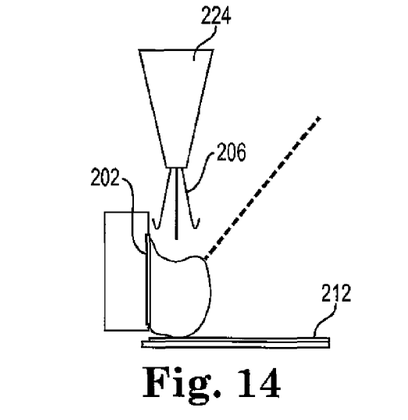
FIG. 14 is a schematic side view of the solder post of FIG. 13 being reformed with an applied laser and application of pressurized material.
Figure 15:
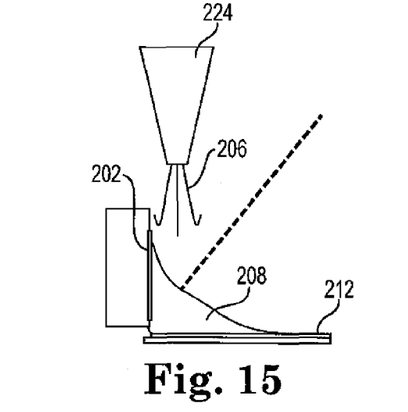
FIG. 15 is a schematic side view of the ellipsoid protrusion of FIG. 14 reformed into a fillet with an applied laser and application of pressurized material.

The process illustrated in FIGS. 7-9 and/or FIGS. 10-12 can be supplemented by application of a pressurized material while the solder post is being deformed, as is illustrated in FIGS. 13-15. In the illustrated schematic embodiment, an exemplary slider 200 is shown, with a suspension arm 210 supporting the slider 200. Slider 200 is attached to suspension arm 210, such as with an adhesive, for example. The slider 200 includes a bonding pad 202 attached to an outer surface, and solder post 204 is attached to and extends from bonding pad 202. Suspension arm 210 includes a bonding pad 212, which is attached to an outer surface so that the bonding pad 212 is generally perpendicular to bonding pad 202 of slider 200. As shown, the solder post 204 extends at least partially over the bonding pad 212. In order to electrically connect the slider 200 to the suspension arm 210, the solder post 204 is reformed to provide a physical connection between the bonding pad 202 and bonding pad 212.

A pressurized material represented by the material stream 206 is directed at an angle relative to the solder post 204, wherein at least a component of the force of the stream is directed toward the bonding pad 212. As a laser 220 is applied to the solder post 204, the pressurized material provides sufficient downward pressure onto the molten solder post material to direct the material toward the bonding pad 212. The force from the pressurized material can be used to direct the material to be deformed in a specific manner to provide a solder fillet 208 for a desired electrical connection between bonding pad 202 and bonding pad 212, as is illustrated in FIG. 15. This step can allow for the use of a smaller solder post 204 since the material can be more confined to a desired location than if it is allowed to deform with only the application of a laser or other deformation force. In addition, the material used for the material stream 206 can provide a non-oxidized state for the resulting solder because the material used can provide protection of the solder post 204 during the reflow process.

In a specific example, the pressurized material is a nitrogen gas, although other materials are contemplated. The pressurized material can be directed at the solder post 204 with a nozzle 224, wherein a representation of such a nozzle is represented in FIGS. 13-15. As shown, the material stream 206 that exits the nozzle 224 is directed in a generally downward direction, which is approximately parallel to the surface of the bonding pad 212 and approximately perpendicular to the surface of the bonding pad 202. As shown, due to the spray of the pressurized material, portions of the material stream 206 can be directed at angles that are less than or greater than the parallel or perpendicular relative angles described above relative to the bonding pads 202 and 212. In an alternative embodiment, a nozzle is directed at the solder post at a different angle in order to provide a different deformation of the post during the deformation process (e.g., to create a certain size, shape, and or configuration for the resultant solder fillet).

In embodiments of the invention, the solder posts may be made of any suitable solder material or combination of solder materials, such as SnPb (tin-lead) or lead free solder, such as SnCu (tin-copper), SAC (tin-silver-copper), SnBi (tin-bismuth), ZnAl (zinc-aluminum), In (indium) and Sn (tin), for example. Flux may or may not be present within the solder material.

In embodiments of the invention, the solder post or pre-bump may be provided on the slider bond pads, the suspension bond pads, or both the slider bond pads and the suspension bond pads. In cases in which the solder post or pre-bump is provided on either the suspension bond pad alone or in a configuration in which both a suspension bond pad and a slider bond pad include a solder post or pre-bump, one or more lasers are applied at an angle to the one or more solder posts in order to deforms the post(s) into one or more ellipsoid protrusions, and then further deform the protrusion(s) into a right angled solder fillet of the type shown and described above.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of forming an electrical interconnection between a slider pad and a suspension pad that is adjacent to and positioned at an angle relative to the slider pad, the method comprising the steps of:
    forming a solder bump on a first surface of the slider pad;
    reshaping the solder bump into a protrusion having an ellipsoidal shape that extends from the slider pad and contacts the suspension pad; and
    applying a laser to the ellipsoidal protrusion to reflow the solder bump while simultaneously applying a pressure to the solder bump in order to form a solder fillet between the slider pad and the suspension pad.

2. The method of claim 1, wherein the step of applying pressure to the solder bump comprises ejecting material in a downward direction from a pressurized source toward the solder bump.

3. The method of claim 2, wherein the ejected material comprises pressurized nitrogen and wherein the pressurized source comprises a nozzle.

4. The method of claim 2, wherein the pressure is applied in a direction that is generally parallel to the first surface of the slider pad.

5. The method of claim 1, wherein the step of reshaping the solder bump comprises applying a laser to the solder bump.

6. The method of claim 5, wherein the forming step comprises forming a solder bump having an aspect ratio of solder volume to slider pad area that provides the ellipsoidal shape to the protrusion after application of the laser to the solder bump.

7. The method of claim 1, further comprising the steps of:
    forming a solder bump on the suspension pad;
    reshaping the solder bump into a protrusion having an ellipsoidal shape that extends from the suspension pad and contacts one of the slider pad and the protrusion extending from the slider pad; and
    applying a laser to the ellipsoidal protrusion to reflow the solder bump while simultaneously applying a pressure to the solder bump extending from the suspension pad in order to form a solder fillet between the slider pad and the suspension pad.

8. A method of making a solder bump on each of a plurality of slider pads for use in forming a plurality of electrical interconnections, each of which is between one slider pad and one suspension pad, the method comprising the steps of:
    forming a solder post on each of a plurality of slider pads, wherein the slider pads are positioned adjacent to each other relative to a plurality of sliders of a wafer;
    encasing the solder posts in a protective material;
    separating the plurality of slider pads from each other; and
    removing the protective material to expose the solder post of each of the slider pads.

9. The method of claim 8, wherein the slider pads are positioned in multiple rows on the wafer.

10. The method of step 9, wherein the step of separating the plurality of slider pads from each other comprises:
    slicing the wafer into multiple rows, each of which corresponds to one of the rows of slider pads; and
    dicing each of the multiple rows into a plurality of sliders, each of which comprises one of the slider pads.

11. The method of claim 8, further comprising a step of placing a plurality of auxiliary bond pads on an outer surface of the encasement material, wherein each of the auxiliary bond pads corresponds with a primary bond pad positioned on the wafer.

12. The method of claim 11, wherein the auxiliary bond pads comprise gold bond pads.

13. The method of claim 8, wherein the step of removing the protective material comprises etching the protective material away from each of the solder posts.

14. The method of claim 8, further comprising the following steps after the protective material removal step:
    forming each of the solder posts into a solder bump on a first surface of each slider pad;
    reshaping each solder bump into a protrusion having an ellipsoidal shape that extends from one of the slider pads and contacts one of a plurality of suspension pads; and
    applying a laser to each reshaped protrusion to reflow each solder bump while simultaneously applying a downward pressure to the solder bump in order to form a solder fillet between each slider pad and its corresponding suspension pad.

15. A method of forming an electrical interconnection between a slider pad and a suspension pad that is adjacent to and positioned at an angle relative to the slider pad, the method comprising the steps of:
    forming a solder bump on a first surface of the suspension pad;
    reshaping the solder bump into a protrusion having an ellipsoidal shape that extends from the suspension pad and contacts the slider pad; and
    applying a laser to the ellipsoidal protrusion to reflow the solder bump while simultaneously applying a pressure to the solder bump in order to form a solder fillet between the slider pad and the suspension pad.

* * * * *